United States Patent
Moon et al.

(10) Patent No.: US 9,992,757 B2
(45) Date of Patent: Jun. 5, 2018

(54) DONOR UNIT, REMOTE UNIT, AND MOBILE COMMUNICATION BASE STATION SYSTEM HAVING SAME

(71) Applicants: KMW Inc., Hwaseong, Gyeonggi-Do (KR); Sogang University Research Foundation, Seoul (KR)

(72) Inventors: Young-Chan Moon, Gyeonggi-do (KR); Myong-Sik Lee, Gyeonggi-do (KR); Chang-Seob Choi, Gyeonggi-do (KR); Dae-Hyoung Hong, Seoul (KR); Sang-Won Yun, Gyeonggi-do (KR); Won-Jin Sung, Seoul (KR); Young-Lok Kim, Seoul (KR); Ok-Hyun Jeong, Gyeonggi-do (KR); Doo-Hun Choi, Seoul (KR)

(73) Assignees: KMW INC., Hwaseong, Gyeonggi-do (KR); Sogang University Research Foundation, Seoul (KR)

( * ) Notice: Subject to any disclaimer, the term of this patent is extended or adjusted under 35 U.S.C. 154(b) by 97 days.

(21) Appl. No.: 15/140,836

(22) Filed: Apr. 28, 2016

(65) Prior Publication Data

US 2016/0242130 A1 Aug. 18, 2016

Related U.S. Application Data

(63) Continuation of application No. PCT/KR2014/009799, filed on Oct. 17, 2014.

(30) Foreign Application Priority Data

Oct. 28, 2013 (KR) .................. 10-2013-0128644
Sep. 16, 2014 (KR) .................. 10-2014-0122801

(51) Int. Cl.
*H04W 56/00* (2009.01)
*H04B 7/155* (2006.01)
*H04W 88/08* (2009.01)

(52) U.S. Cl.
CPC .......... *H04W 56/001* (2013.01); *H04B 7/155* (2013.01); *H04W 88/085* (2013.01)

(58) Field of Classification Search
CPC .................................................... H04W 56/01
See application file for complete search history.

(56) References Cited

U.S. PATENT DOCUMENTS

| 2012/0207206 A1 | 8/2012 | Samardzija et al. |
| 2012/0300766 A1 | 11/2012 | Chen et al. |

(Continued)

FOREIGN PATENT DOCUMENTS

| EP | 2197221 A1 | 6/2010 |
| EP | 2 720 429 A1 | 4/2014 |

(Continued)

OTHER PUBLICATIONS

Supplementary European Search Report dated Jun. 19, 2017 in corresponding European Patent Application No. 14857389.2.

*Primary Examiner* — Gerald A Smarth
(74) *Attorney, Agent, or Firm* — Mintz Levin Cohn Ferris Glovsky and Popeo, P.C.; Kongsik Kim; Colleen H. Witherell

(57) ABSTRACT

The present invention relates to a mobile communication base station system comprising: a donor unit connected to a baseband unit; and a remote unit installed at the base station antenna side, wherein the donor unit has a baseband signal processing part including a digital signal processing part for processing interface with the baseband unit, a wireless communication part for processing a wireless communication signal between the baseband signal processing part and the remote unit, and a synchronization and communication control part for processing a synchronizing signal and a communication control signal from the baseband unit, and wherein the remote unit has a service signal processing part for processing MIMO interface with a base station antenna, a wireless communication part for processing a wireless communication signal between the service signal processing part and the donor unit, and a synchronization and communication control part for processing a synchronizing signal and a communication control signal from the donor unit. The donor unit and the remote unit can be easily expanded in a daisy-chain fashion, thereby broadening coverage, and can also be utilized for multihop relay, and thus are suitable for small cell-based next generation communication systems for capacity expansion.

15 Claims, 10 Drawing Sheets

(56) References Cited

U.S. PATENT DOCUMENTS

| | | | | |
|---|---|---|---|---|
| 2014/0016583 A1* | 1/2014 | Smith | ................... | H04W 12/06 |
| | | | | 370/329 |
| 2015/0256358 A1* | 9/2015 | Stapleton | ............ | H04W 52/245 |
| | | | | 370/329 |
| 2017/0238361 A1* | 8/2017 | Pawar | ................. | H04W 88/085 |
| | | | | 455/561 |
| 2017/0294928 A1* | 10/2017 | Gale | ................... | H04B 1/1027 |

FOREIGN PATENT DOCUMENTS

| | | |
|---|---|---|
| KR | 10-2008-0057493 A | 6/2008 |
| WO | 2012/139781 A1 | 10/2012 |
| WO | 2013/048526 A1 | 4/2013 |
| WO | 2013/050084 A1 | 4/2013 |

* cited by examiner

DONOR UNIT, REMOTE UNIT, AND MOBILE COMMUNICATION BASE STATION SYSTEM HAVING SAME

CROSS REFERENCE TO RELATED APPLICATIONS

This application is a continuation of International Application No. PCT/KR2014/009799 filed on Oct. 17, 2014, which claims priorities to Korean Applications No. 10-2013-0128644 filed on Oct. 28, 2013 and No. 10-2014-0122801 filed on Sep. 16, 2014, which applications are incorporated herein by reference.

TECHNICAL FIELD

The present invention relates to a mobile communication base station including a small base station in a network for mobile communication, such as Personal Communication Services (PCS), Cellular, Code Division Multiple Access (CDMA), Global System for Mobile communication (GSM), and Long Term Evolution (LTE), and more particularly, to a donor unit installed at a baseband unit side, a remote unit installed at a baseband antenna side, and a mobile communication base station system including the donor unit and the remote unit.

BACKGROUND ART

In general, a base station system of a mobile communication network includes a base station main body part for processing transmission and reception signals, and an antenna part including a plurality of radiation elements to transmit and receive radio signals. The base station main body part is generally installed at a low location on the ground, the antenna part is installed at a high location, such as the top of a building or a tower, and the base station main body part is connected to the antenna part through a feeder cable.

Lately, as towers can be easily installed by virtue of miniaturization and weight reduction of devices for processing radio signals, a structure of installing a Remote Radio Head (RRH) in charge of processing of transmission and reception radio signals in front of an antenna is widely used in order to compensate for loss on coaxial cables typically used for transmission of signals between the base station main body part and the antenna part.

That is, the base station main body part for processing transmission and reception signals is divided into an RF signal processing part and a baseband signal processing part, wherein the baseband signal processing part is included in the base station main body part, and the RF signal processing part is included in the RRH. In this case, the base station main body part can be considered as a "baseband unit". At this time, the base station main body part (baseband unit) and the RRH may be configured to transmit transmission and reception signals through an optical cable according to an optical communication method, in consideration of, for example, signal loss on a coaxial cable.

FIG. 1 is a block configuration diagram schematically showing an example of a typical base station system including an RRH. In FIG. 1, a state in which a plurality of base station systems 10 are connected to a base station controller (for example, Mobility Management Entity/Gateway (MME/GW) of a Long Term Evolution (LTE) system) is shown. The base station system 10 is configured with a Base Band Unit (BBU) 11, a base station antenna, and a RRH 12 installed at the base station antenna side. The baseband unit 11 is connected to the RRH 12 through an optical cable 13.

Meanwhile, in order to satisfy a service subscriber's demand of requiring massive data services, studies into methods such as LTE MIMO technology for transmitting massive data efficiently in a limited frequency band are actively conducted. Also, studies into a method of intensively providing a data service to a smaller number of people by implementing a base station in unit of a smaller cell rather than a typical method of implementing a base station in unit of a macro cell, and into a femto cell base station for implementing the method are actively conducted. In this respect, the structure in which the base station 10 is configured with the base band unit 11 and the RRH 12 installed at the base station antenna side, as shown in FIG. 1, is very suitable to implement such a femto cell base station.

However, the structure in which the base band unit 11 is connected to the RRH 12 through an optical cable requires relatively high installation costs although the structure is suitable in view of signal quality or transmission capacity. Particularly, in downtown areas, the initial or additional installation of optical cables involves many limitations due to neighboring buildings, roads, and a urban landscape.

In order to overcome the problem, a method of connecting the baseband unit 11 to the RRH 12 through wireless communication is considered. However, in order to transfer massive data according to a wireless communication method, wireless communication equipment having a broad bandwidth and high-performance is required.

SUMMARY

An aspect of the present disclosure provides a donor unit and a remote unit for implementing a mobile communication base station system that can be newly installed quickly and efficiently at low cost.

Another aspect of the present disclosure provides a donor unit and a remote unit for implementing a mobile communication base station system that can transfer data through a more efficient wireless communication method while satisfying massive data transfer requirements between a baseband unit and the donor unit/the remote unit.

Still another aspect of the present disclosure provides a method of using a data structure (for example, a Long Term Evolution (LTE) frame data structure) that is transmitted to user equipment through an efficient wireless communication method.

In accordance with an aspect of the present invention, there is provided a mobile communication base station system including a donor unit connected to a baseband unit, and a remote unit installed at a base station antenna side.

The donor unit may include a baseband signal processor including a digital signal processor to process an optical interface with the baseband unit; a wireless communication unit to process a wireless communication signal between the baseband signal processor and the remote unit; and a synchronization and communication controller to process a communication control signal and a synchronization signal received from the baseband unit.

The remote unit may include a service signal processor to process a Multiple Input Multiple Output (MIMO) interface with the base station antenna; a wireless communication unit to process a wireless communication signal between the service signal processor and the donor unit; and a synchronization and communication controller to process a synchronization signal and a communication control signal received from the donor unit.

The donor unit and the remote unit can be easily expanded in a daisy-chain fashion, thereby broadening coverage, and can also be utilized for multihop relay, and thus are suitable for small cell-based next generation communication systems for capacity expansion.

DETAILED DESCRIPTION

Figure 1:
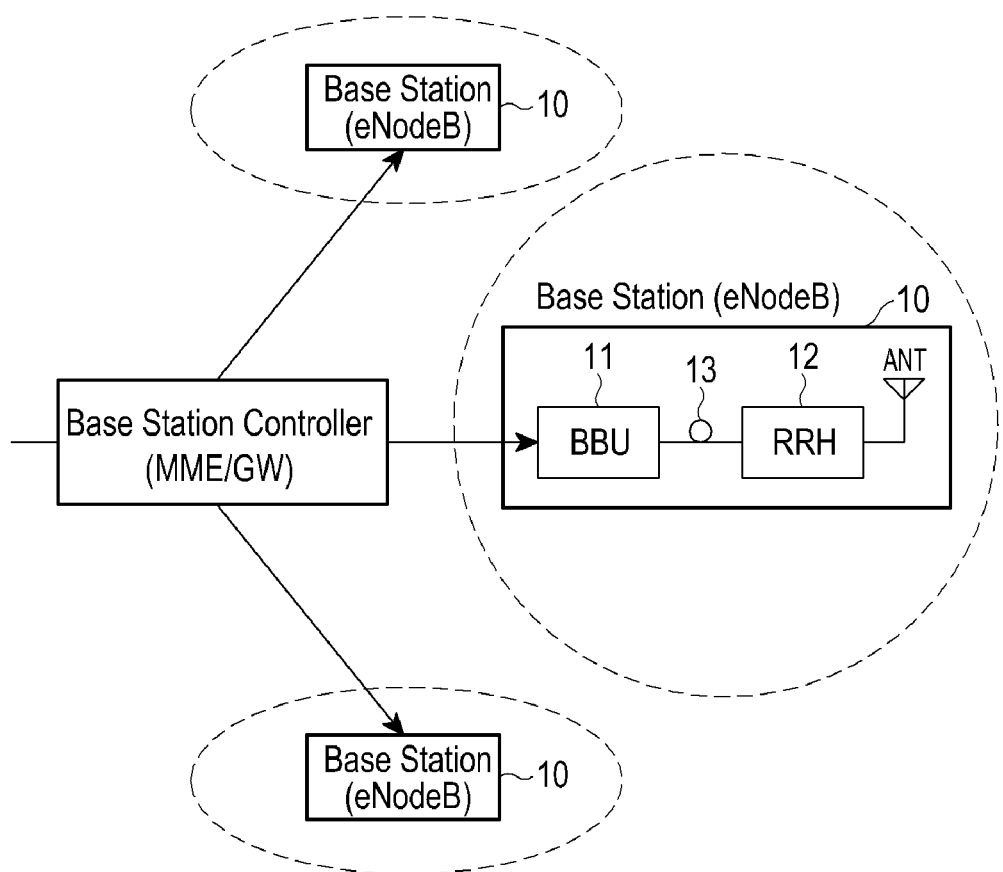
FIG. 1 is a block configuration diagram schematically showing an example of a typical base station system including a Remote Radio Head (RRH)

Now, preferred embodiments of the present disclosure will be described in detail with reference to the accompanying drawings. Throughout the drawings, like reference numerals will be understood to refer to like components. The following description includes various specific details such as components to assist in that understanding but these are to be regarded as merely exemplary. Accordingly, those of ordinary skilled in the art will recognize that various changes and modifications of the specific details can be made without departing from the scope and spirit of the invention.

Figure 2A:
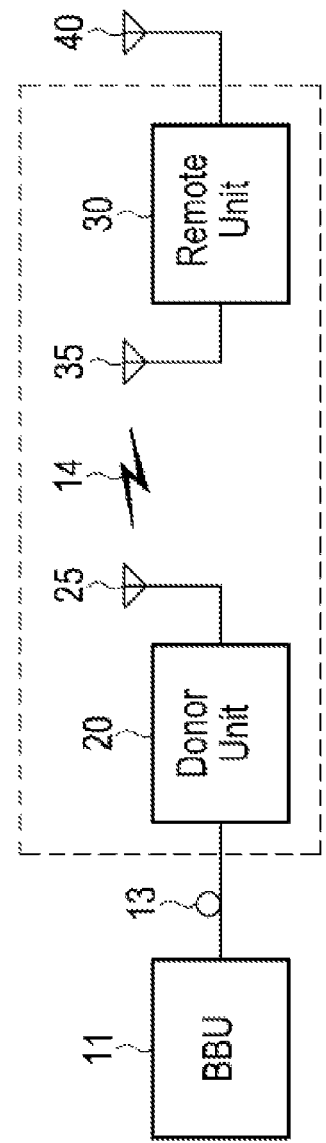
FIGS. 2A and 2B are block configuration diagrams schematically showing a base station system including a donor unit and a remote unit, according to an embodiment of the present disclosure.
Figure 2B:
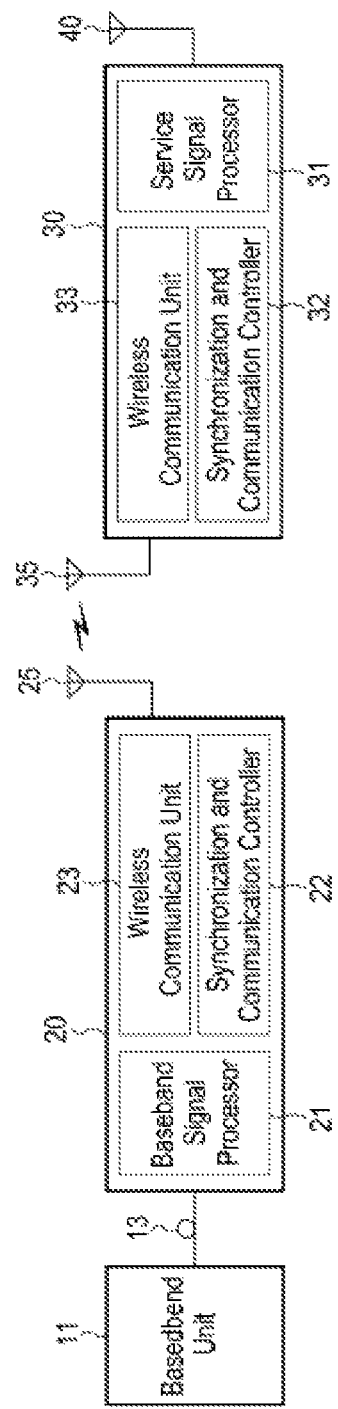

FIGS. 2A and 2B are block configuration diagrams schematically showing a base station system including a donor unit and a remote unit, according to an embodiment of the present disclosure. FIG. 2B is a detailed block configuration diagram showing main parts of components shown in FIG. 2A. First, referring to FIG. 2A, a base station system according to an embodiment of the present disclosure may include, like a typical base station system, a baseband unit (BBU) 11, a donor unit 20, a base station antenna 40, and a remote unit 30 installed at the base station antenna side. The donor unit installed at the baseband unit side may be connected to the remote unit 30 according to a wireless communication method 14. That is, the baseband unit 11 may be connected to the donor unit 20 to transfer signals to the remote unit 30 according to the wireless communication method 14, wherein the remote unit 30 adopts a structure for transferring signals to the donor unit 20 through wireless communication.

In more detail, the baseband unit 11 may generate a baseband signal as a digital signal, convert the baseband signal into an optical signal, and then transfer the optical signal to the donor unit 20. The donor unit 20 may convert the optical signal into a wireless communication signal according to a predetermined method, and provide the wireless communication signal to the remote unit 30. Also, the donor unit 20 may receive a wireless communication signal (that is, an uplink signal transmitted from a mobile station) from the remote unit 30, convert the wireless communication signal into an optical signal, and then provide the optical signal to the baseband unit 11.

FIG. 2B is a detailed block configuration diagram showing the donor unit 20 connected to the baseband unit 11. Referring to FIG. 2B, the donor unit 20 may include a baseband signal processor 21, a synchronization and communication controller 22, and a wireless communication unit 23. The baseband signal processor 21 may receive a downlink signal output according to, for example, an optical communication method from the baseband unit 11, check the downlink signal to divide the downlink signal into a plurality of transmission channels corresponding to a plurality of transmission paths according to, for example, a Multiple Input Multiple Output (MIMO) method, convert the respective transmission channels into a plurality of predetermined Radio Frequency (RF) bands, shift the frequencies of the individual RF bands by a predetermined amount so that the RF signals can be distinguished in the frequency band, and then output the resultant signals. The synchronization and communication controller 22 may generate a synchronization signal for synchronizing with an output frequency of a predetermined frequency band using the signal provided from the baseband unit 11, and generate a control signal of a predetermined frequency band according to a control command related to communication control provided from the baseband unit 11. The wireless communication unit 23 may synthesize the signals output from the baseband signal processor 21 with the synchronization signal and the control signal output from the synchronization and communication controller 22, convert the synthesized signal into a predetermined frequency band, and then transmit the resultant signal in a wireless fashion, wherein the predetermined frequency may be a milimeter-wave frequency.

Meanwhile, the remote unit 30 may include a wireless communication unit 33, a service signal processor 31, and a synchronization and communication unit 32. The wireless communication unit 33 may receive a signal of a predetermined frequency band (for example, a milimeter-wave band) transmitted in the wireless fashion from the wireless communication unit 23 of the donor unit 20, convert the signal of the predetermined frequency band into a signal of an RF band which belongs to a frequency band for a predetermined mobile communication service, and then output the signal of the RF band. The service signal processor 31 may receive the signal of the RF band output from the wireless communication unit 33, divide the signal of the RF band into a plurality of transmission channels corresponding to a plurality of transmission paths according to, for example, the MIMO method, convert the individual transmission channels into a plurality of RF bands which belong to the frequency band for the predetermined mobile communication service, respectively, and then output the RF bands to the base station antenna 40. The synchronization and communication controller 32 may extract a synchronization signal for frequency synchronization from the signal output from the wireless communication unit 33, also receive a control signal related to communication control, and perform predetermined operation based on the synchronization signal and the control signal.

Also, the service signal processor 31 of the remote unit 30 may receive a reception signal from the base station antenna 40, divide the reception signal into a plurality of reception channels corresponding to a plurality of reception paths according to, for example, the MIMO method, convert the individual reception channels into a plurality of RF bands which belong to the frequency band for the predetermined mobile communication service, shift the frequencies of the RF bands by a predetermined amount so that the RF bands can be distinguished in the frequency band, and then output the resultant signals. The wireless communication unit 23 of the donor unit 20 and the wireless communication unit 33 of the remote unit 30 may include milimeter-wave antennas 25 and 35, respectively, to transmit/receive radio signals in the milimeter-wave band. The base station antenna 40 and the milimeter-wave antenna 35 of the remote unit 30 may have separated type structures with independent directivities.

Also, the synchronization and communication controller 32 of the remote unit 30 may generate a communication control response signal of a predetermined frequency (milimeter-wave) band, and output the communication control response signal to the donor unit 20, in order to transmit a response to a communication control signal received from the baseband unit side to the baseband unit side.

Also, the wireless communication unit 33 of the remote unit 30 may synthesize the communication control response signal with signals of reception channels output from the service signal processor 31 and the synchronization and communication controller 32, convert the synthesized signal into a signal of a predetermined frequency (milimeter-wave) band, and then transmit the signal of the predetermined frequency band to the donor unit 20 in a wireless fashion.

Also, in the donor unit 20, the wireless communication unit 23 may receive the signal transmitted in the wireless fashion from the wireless communication unit 33 of the remote unit 30, convert the signal into a signal of a RF band which belongs to the frequency band for the predetermined mobile communication service, and output the signal of the RF band to the baseband signal processor 21.

Also, the baseband signal processor 21 of the donor unit 20 may receive the signal from the wireless communication unit 23, divide the received signal into a plurality of reception channels corresponding to a plurality of transmission and reception paths according to the MIMO method, convert the respective reception channels into a plurality of predetermined intermediate frequency (IF) bands, respectively, convert the IF bands into a plurality of baseband signals through an analog/digital converter, and then provide the baseband signals to the baseband unit 11.

Also, the synchronization and communication controller 22 of the donor unit 20 may extract a control response signal related to communication control transmitted from the remote unit side, from the signal output from the wireless communication unit 23, and provide the control response signal to the baseband signal processor 21.

Figure 2C:
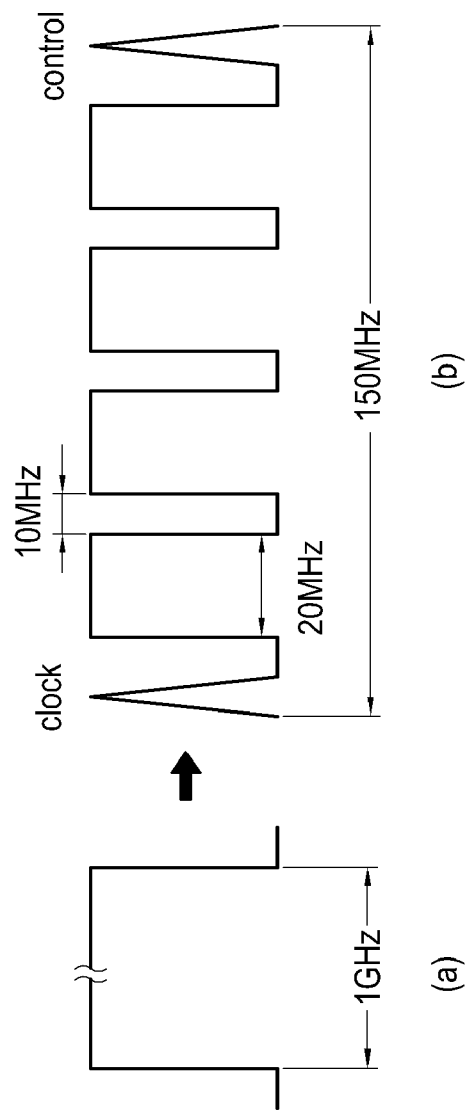
FIG. 2C shows a waveform of a transmission signal that is divided into a plurality of channels through a Multiple Input Multiple Output (MIMO) method in a donor unit, according to an embodiment of the present disclosure.

Also, the donor unit 20 can perform a part of functions that are processed by a typical Remote Radio Head (RRH) 12 (see FIG. 1). Since the donor unit 20 can perform signal processing according to the Common Public Radio Interface (CPRI) standard to transmit massive data to the remote unit 30 through micro-wave communication, it is possible to reduce a transmission bandwidth while transmitting data more efficiently. For example, as shown in FIG. 2C, if the baseband unit 11 transmits an optical communication signal with a bandwidth of 1 GHz according to the CPRI standard, a bandwidth of about 150 MHz may be required to transmit a radio signal from the donor unit 20 to the remote unit 30.

Figure 2D:
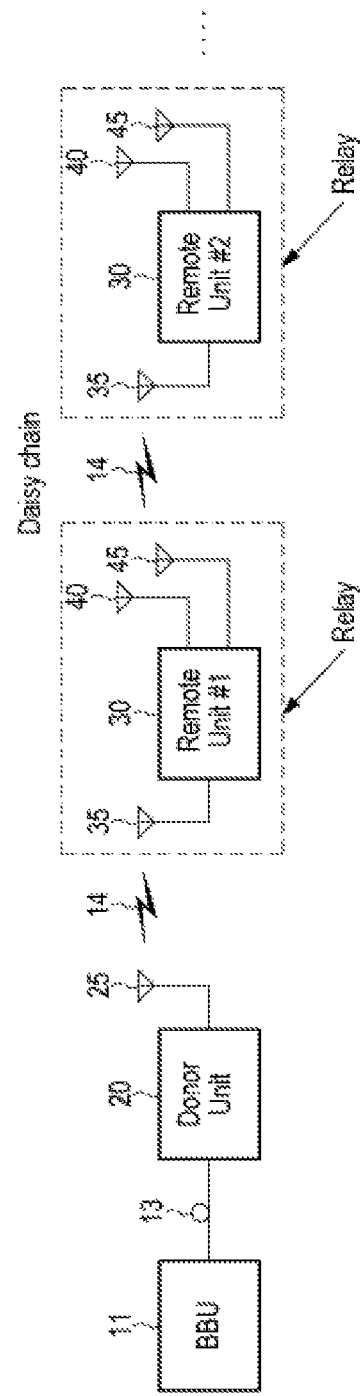
FIGS. 2D, 2E, and 2F are block configuration diagrams showing various examples of methods of connecting a donor unit to a remote unit.

As shown in FIG. 2D, the donor unit 20 and the remote unit 30 can be easily expanded in a daisy-chain fashion, thereby broadening coverage. For example, the donor unit 20 may be connected to a first remote unit, a second remote unit, . . . , a N-th remote unit. That is, a single donor unit 20 can be connected to a plurality of remote units 30.

The remote unit 30 may also be utilized in the form of a relay for multi-hop, and thus be suitable for small cell-based next generation communication systems for capacity expansion. For example, the remote unit 30 may include a relay antenna 45 for amplifying a radio signal received from the donor unit 20 and transferring the amplified signal as it is to the neighboring remote unit in a relay fashion, and components related to the relay antenna 45. This is aimed to broaden coverage by transferring a radio signal of a milimeter-wave band converted into an analog signal in a relay fashion.

Also, by expanding the donor unit 20 and the remote unit 30 in the daisy-chain fashion, a plurality of remote units can be utilized in common to simplify design and increase hardware efficiency. For example, a configuration of sharing a part of the modem of the former remote unit with the latter remote unit is possible.

Figure 2E:
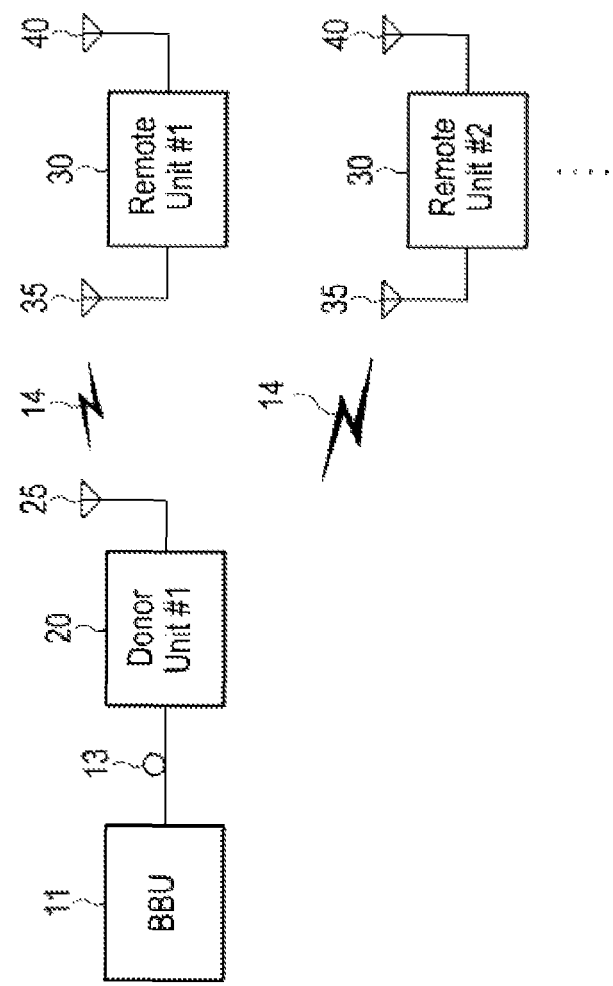
Figure 2F:
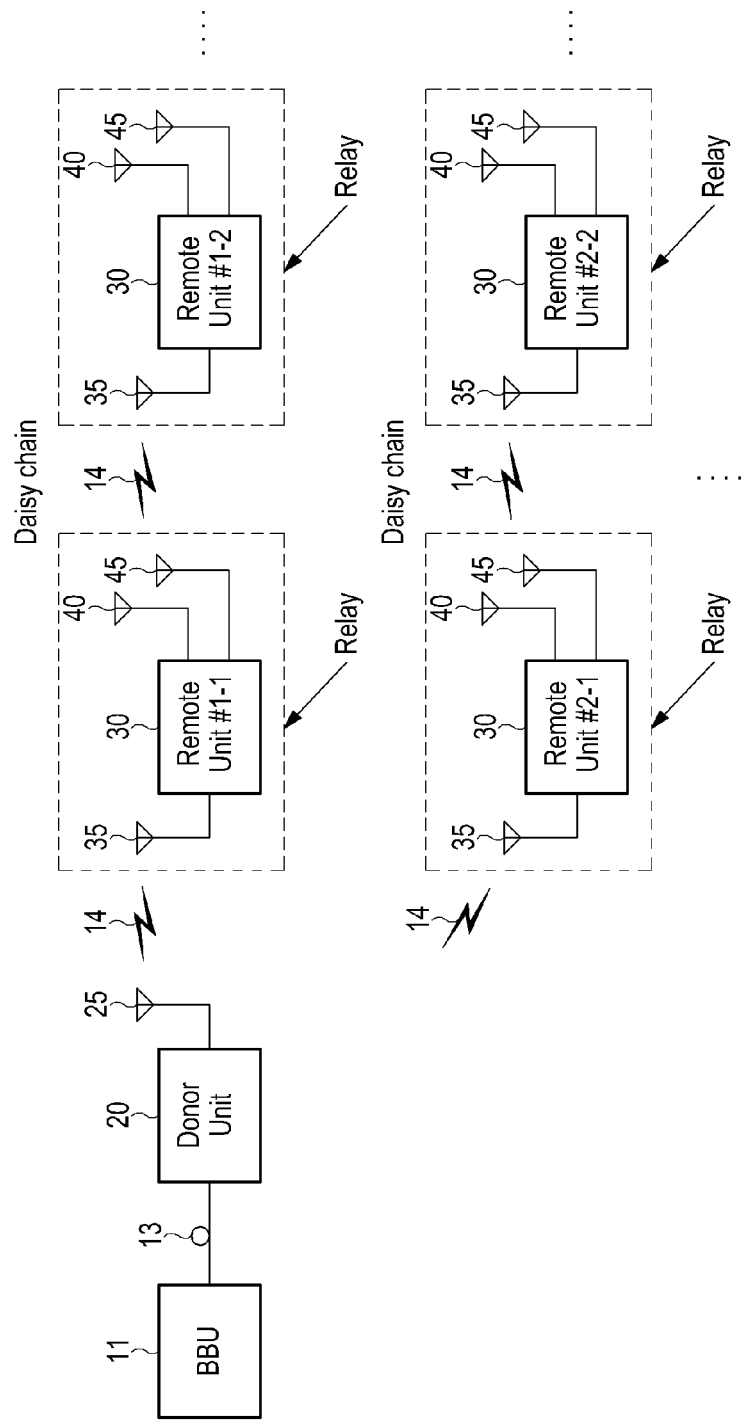

Also, as shown in FIG. 2E, a single donor unit 20 may be connected to a plurality of remote units 30 in a point to multi-point wireless link fashion. Also, as shown in FIG. 2F, a single donor unit 20 may be connected to a plurality of remote units 30 through a combination of the daisy chain fashion and the point to multi-point wireless link fashion. Thereby, it is possible to effectively broaden coverage while minimizing costs for network construction and maximizing the efficiency of signal transmission.

Figure 3:
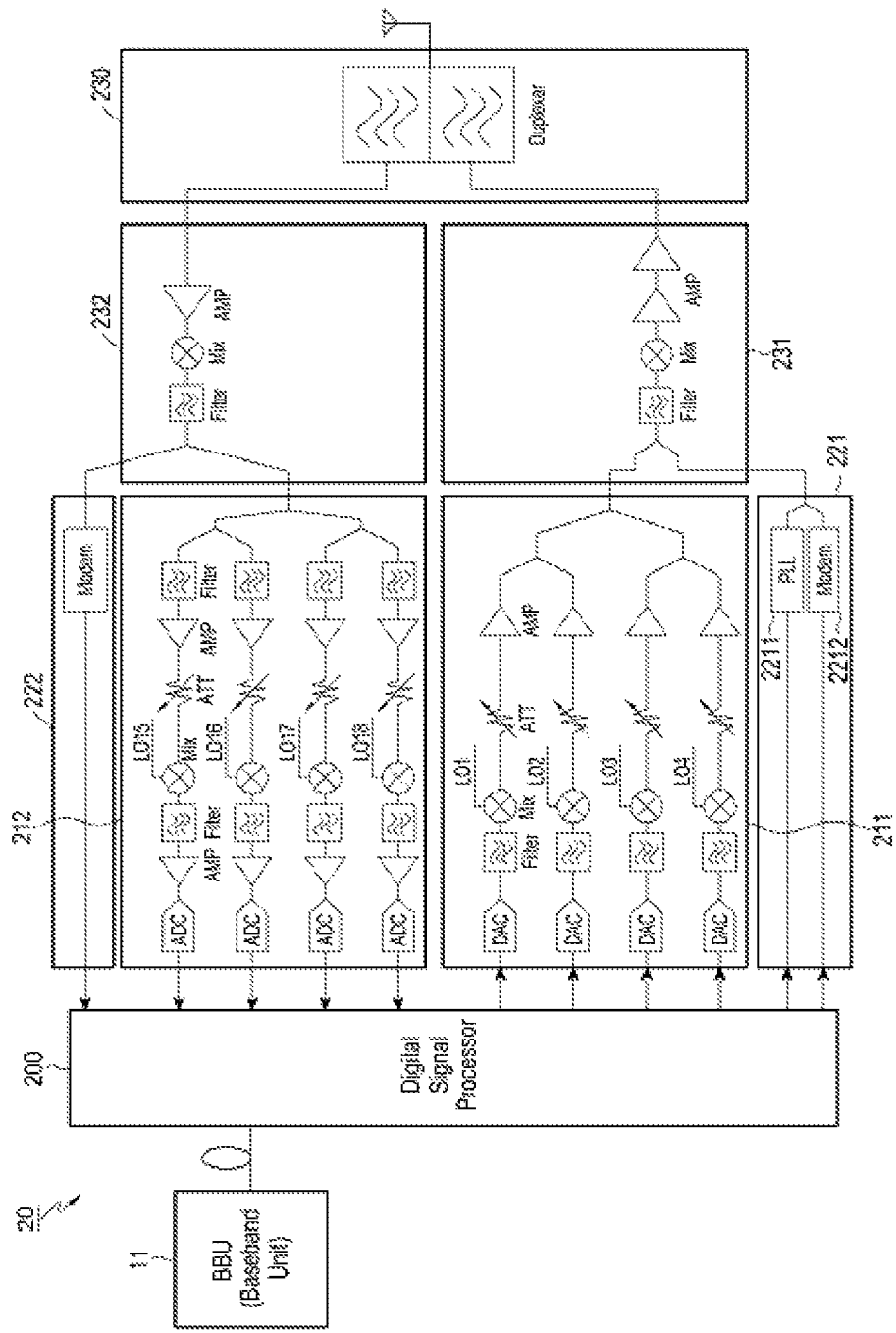
FIG. 3 is a detailed block configuration diagram showing a donor unit installed at a baseband unit side, shown in FIGS. 2A and 2B.

FIG. 3 is a detailed block configuration diagram showing the donor unit 20 installed at the baseband unit side, shown in FIGS. 2A and 2B. FIG. 3 shows an example of the donor unit 20 implemented according to, for example, a 4T4R MIMO method. Referring to FIG. 3, the baseband signal processor 21 of the donor unit 20 shown in FIG. 2B may correspond to a digital signal processor 200, a downlink service band frequency converter 211, and a uplink service band frequency converter 212. Also, the synchronization and communication controller 22 of the donor unit 20 shown in FIG. 2B may correspond to a synchronization and communication control signal transmitter 221 and a communication control signal receiver 222. Also, the wireless communication unit 23 of the donor unit 20 shown in FIG. 2B may correspond to a transmission signal converter 231, a reception signal converter 232, and a transmission and reception divider 230.

The digital signal processor 200 may receive a downlink signal output according to, for example, the optical communication method from the baseband unit 11, and check the downlink signal to divide the downlink signal into a plurality of transmission channels corresponding to a plurality of transmission paths according to, for example, the MIMO method. The digital signal processor 200 may have a function of receiving an optical signal from, for example, the baseband unit 11 and converting the optical signal into an electrical signal, and a function of restoring the converted electrical signal according to a signal demodulation format corresponding to a predetermined signal format, that is, a signal modulation format used in the baseband unit 11. In order to perform the functions, the digital signal processor 200 may include a structure of a Small Form-factor Pluggable (SFP) optical transceiver and a structure of a serial-to-parallel/parallel-to-serial converter according to, for example, the CPRI standard. Also, the digital signal processor 200 may include an appropriate digital signal processor to analyze a baseband signal and divide the baseband signal into signals of four transmission paths according to the MIMO method, that is, signals of four transmission channels, or to extract data corresponding to a communication control command received from the baseband unit 11. The main part of the digital signal processor 200 may be implemented with a Field Programmable Gate Array (FPGA).

The downlink service band frequency converter 211 may include four digital/analog converters DAC, four frequency upconverters Mix, and four transmission amplifiers AMP. The digital/analog converters DAC may convert the signals of the four transmission channels received from the digital signal processor 200 into IF analog signals. The frequency upconverters Mix may synthesize the signals output from the respective digital/analog converters DAC with local oscillation signals LO1, LO2, LO3, and LO4 set to different values to shift the signals by a predetermined amount so that the signals can be distinguished in the RF band, thus converting the signals into RF signals of predetermined transmission frequency bands. The transmission amplifiers AMP may amplify the signals output from the frequency upconverters Mix to high power. Also, in the downlink service band frequency converter 211, four filters Filter for filtering signals may be additionally disposed between the digital/analog converters DAC and the frequency upconverters Mix. Also, four attenuators ATT for adjusting output levels of the frequency upconverters Mix may be additionally disposed.

The synchronization and communication control signal transmitter 221 may include a frequency synchronization signal transmitter 2211 and a communication control signal transmitter 2212. The frequency synchronization signal transmitter 2211 may be configured with a Phase Locked Loop (PLL) to use a signal output from the digital signal processor 200 to generate a synchronization signal of a predetermined frequency (milimeter-wave) band synchronized to the frequency of a signal provided from the baseband unit 11. The communication control signal transmitter 2212 may be configured with a modem to generate data corresponding to a communication control command output from the digital signal processor 200 as a communication control signal of a predetermined RF band.

The transmission signal converter 231 may include a radio communication band upconverter Mix configured to mix the signals output from the downlink service band frequency converter 211 with the signals output from the synchronization and communication control signal transmitter 221, and synchronize the mixed signals with a signal of a carrier-wave band set to, for example, a milimeter-wave band. Also, the transmission signal converter 231 may further include a filter Filter configured to filter the mixed signals obtained by mixing the signals output from the downlink service band frequency converter 211 with the signals output from the synchronization and communication control signal transmitter 221, and an amplifier AMP configured to appropriately amplify and adjust the output of the radio communication band upconverter Mix.

The transmission/reception divider 230 may include a duplexer configured to process a transmission/reception band of a carrier-wave band set to, for example, a milimeter-wave band, and an antenna connected to the duplexer. The transmission/reception divider 230 may divide signals transmitted/received between the donor unit 20 and the remote unit 30. The transmission/reception divider 230 may transmit a signal output from the transmission signal converter 231 to the remote unit 30 in a wireless fashion.

The reception signal converter 232 may include a radio communication band downconverter Mix configured to synthesize, for example, a reception signal (that is, a uplink signal) of a milimeter-wave band, output from the transmission/reception divider 230, with a signal of a predetermined carrier-wave band to convert the reception signal into a RF band. Also, the reception signal converter 232 may further include an amplifier AMP to appropriately amplify the signal output from the transmission/reception divider 230, and a filter Filter to filter the output of the radio communication band downconverter MIX.

The uplink service band frequency converter 212 may distribute the signal output from the reception signal converter 232 to four paths corresponding to four reception channels. The uplink service band frequency converter 212 may include four frequency downconverters Mix and four analog/digital converters ADC. The frequency downconverters Mix may mix the reception signals of the four paths, respectively, with four local oscillation signals LO15, LO16, LO17, and LO18 set to different values to convert the reception signals into predetermined IF bands, in order to demodulate the reception signals of the four paths to their original frequency bands since the frequencies of the reception signals have been appropriately shifted by the remote unit 30. The analog/digital converters ADC may perform analog-to-digital conversion on the signals output from the respective frequency downconverters Mix, and provide the converted signals to the digital signal processor 200. Also, the uplink service band frequency converter 212 may further include a plurality of reception amplifiers AMP to low-noise amplify input or output signals of the respective frequency downconverters Mix, and a plurality of filters Filter to filter the input or output signals of the respective frequency downconverters Mix to the corresponding frequency bands. The uplink service band frequency converter 212 may further include four attenuators ATT to adjust the input levels of the respective frequency downconverters Mix.

The communication control signal receiver 333 may be configured with a modem to extract a communication control response signal transmitted from the remote unit side, from a signal output from the reception signal converter 232, and provide the communication control response signal to the digital signal processor 200 so that the communication control response signal can be provided to the baseband unit 11.

The donor unit 20 shown in FIG. 3 can perform wireless communication very efficiently, compared to a method of modulating signals output from a baseband unit, as they are, into radio signals, which can be considered when a baseband unit is connected to a remote unit through wireless communication. For example, if the baseband unit 11 transmits an optical communication signal with a bandwidth of 1 GHz according to the CPRI standard, the same bandwidth of 1 GHz may be needed to transmit the optical communication signal as it is in a wireless fashion. In this case, if the MIMO method is adopted, four transmission channels may each have a bandwidth of 250 MHz. As such, as the transmission bandwidth is broadened, wireless communication equipment having a broad bandwidth and high-performance may be needed to cover such a broad bandwidth, and also it may be not easy to prepare an available bandwidth to cover the broad bandwidth.

In contrast, the structure according to the embodiment of the present disclosure may adopt a method of dividing, when the baseband unit 11 transmits a signal with a bandwidth of 1 GHz through the donor unit 20, the signal according to a plurality of transmission channels and then converting the divided signals into RF signals so that the signals can be distinguished in the frequency band. Accordingly, as shown in FIG. 2C, each transmission channel may actually require a bandwidth of about 20 MHz, without performing unnecessary data transmission according to the CPRI standard. Although a guard band between neighboring bands is set to about 10 MHz, and bands for the frequency synchronization signal and the communication control signal are added, only a total bandwidth of about 150 MHz may be required. As such, according to the present disclosure, the donor unit 20 installed at the baseband unit side can be efficiently connected to the remote unit 30 through wireless communication.

Also, according to the structure according to the present disclosure as described above, a frequency synchronization signal may be generated by the donor unit 20 installed at the baseband unit side and transmitted to the remote unit side, and the remote unit side may receive the frequency synchronization signal and perform synchronization. However, since the typical method of converting signals output from a baseband unit as they are into radio signals and outputting the radio signals cannot transfer a synchronization signal, a donor unit installed at the baseband unit side and a remote unit need to include separate GPS modules to perform synchronization using GPS signals, which requires a complicated structure. In contrast, according to the present disclosure, since the donor unit 20 installed at the baseband unit side can provide a frequency synchronization signal to the remote unit 30, call quality can be easily improved.

Figure 4:
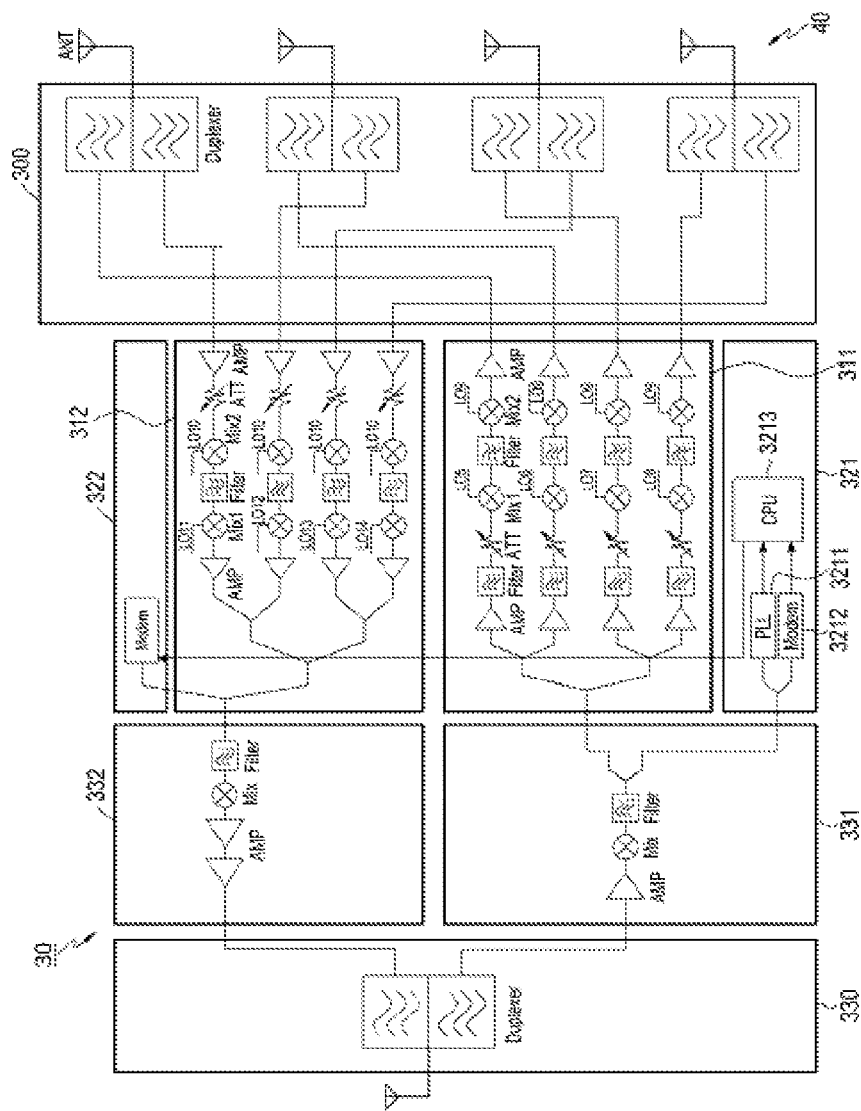
FIG. 4 is a detailed block configuration diagram showing a remote unit shown in FIGS. 2A and 2B.

FIG. 4 is a detailed block configuration diagram showing the remote unit 30 shown in FIGS. 2A and 2B. FIG. 4 shows an example of the remote unit 30 implemented according to, for example, the 4T4R MIMO method. Referring to FIG. 4, the wireless communication unit 33 of the remote unit 30 shown in FIG. 2B may correspond to a reception signal converter 331, a transmission signal converter 332, and a transmission/reception divider 330. Also, the synchronization and communication controller 32 of the remote unit 30 shown in FIG. 2B may correspond to a synchronization and communication control signal receiver 321 and a communication control signal transmitter 322 of FIG. 4. Also, the service signal processor 31 of the remote unit 30 shown in FIG. 2B may correspond to a downlink service band frequency converter 311, a uplink service band frequency converter 312, and a service band transmission/reception divider 300 of FIG. 4.

The transmission/reception divider 330 may be configured with a duplexer configured to process a transmission/reception band of a carrier-wave band set to, for example, a milimeter-wave band, and an antenna connected to the duplexer. The transmission/reception divider 330 may divide signals transmitted/received between the donor unit 20 and the remote unit 30. At this time, the transmission/reception divider 330 may divide a signal transmitted from the donor unit 20, and provide the divided signals to the reception signal converter 331.

The reception signal converter 331 may include a radio communication band downconverter Mix configured to synthesize a reception signal (downlink signal) of, for example, a milimeter-wave band output from the transmission/reception divider 330, with a signal of a predetermined carrier-wave band to convert the reception signal into an RF signal of a service band. Also, the transmission signal converter 332 may further include an amplifier AMP to appropriately amplify and output a signal from the transmission/reception divider 330, and a filter Filter to filter the output of the radio communication band downconverter MIX.

The downlink service band frequency converter 311 may distribute the signal output from the reception signal converter 331 to four paths corresponding to four transmission channels. The downlink service band frequency converter 311 may include four frequency converters Mix. The frequency converters Mix may mix the transmission signals of the four paths, respectively, with four local oscillation signals LO5, LO6, LO7, and LO8 set to different values to convert the transmission signals into predetermined RF signals, in order to demodulate the transmission signals of the four paths to their original frequency bands since the frequencies of the transmission signals have been appropriately shifted by the donor unit 20. Also, the downlink service band frequency converter 311 may include four filters Filter to filter output signals of the frequency converters Mix in order to improve the quality of the output signals, and four additional frequency converters Mix to synthesize output signals of the four filters Filter with RF signals of the corresponding service band. Also, the downlink service band frequency converter 311 may further include a plurality of transmission amplifiers AMP to amplify input or output signals of the frequency converters Mix to high outputs, and a plurality of filters Filter to filter input signals of the frequency converters Mix to the corresponding frequency bands. Also, the downlink service band frequency converter 311 may further include four attenuators ATT to adjust the input levels of the frequency converters Mix.

The service band transmission/reception divider 300 may be configured with a plurality of duplexers corresponding to individual transmission/reception channels, and configured to process transmission/reception bands of a predetermined RF band of a mobile communication service band. The duplexers may be respectively connected to four sub antennas of the base station antenna 40 in order to implement MIMO, and divide transmission/reception signals between the remote unit 30 and the base station antenna 40. The duplexers may divide signals received from the base station antenna 40, and provide the divided signals to the uplink service band frequency converter 312.

The uplink service band frequency converter 312 may include four frequency converters Mix and four reception amplifiers AMP. The frequency converters Mix may synthesize the signals of the four reception channels output from the service band transmission/reception divider 300 with local oscillation signals LO11, LO12, LO13, and LO14 set to different values to shift the signals by a predetermined amount so that the signals can be distinguished in the RF band, thus converting the signals into RF signals of the corresponding reception frequency bands. The reception amplifiers AMP may low-noise amplify signals received from the frequency converters Mix. Also, the uplink service band frequency converter 312 may further include four filters Filter to filter input signals of the frequency converters Mix in order to improve the quality of the input signals, and four additional frequency converters Mix to synthesize the input signals of the filters Filter with RF signals of the corresponding service band. Also, the uplink service band frequency converter 312 may further include a plurality of additional reception amplifiers AMP to low-noise amplify output signals of the frequency converters Mix, and four attenuators ATT to adjust input levels of the frequency converters Mix.

The synchronization and communication control signal receiver 321 may be configured with a frequency synchronization signal extractor 3211 and a modem 3212. The frequency synchronization signal extractor 3211 may be configured with PLL to extract a frequency synchronization signal provided from the donor unit 20 from among signals output from the reception signal converter 331. The synchronization and communication control signal receiver 321 may receive the communication control signal provided from the donor unit 20 from among the signals output from the reception signal converter 331, and provide data according to the communication control signal to a controller (for example, CPU) 3213 to control overall operations of the corresponding remote unit 30. The communication control signal transmitter 322 may be configured with a modem to generate a communication control response signal and provide the communication control response signal to the transmission signal converter 332 under the control of the controller 3213.

The transmission signal converter 332 may include a radio communication band upconverter Mix to mix signals output from the uplink service band frequency converter 312 with signals output from the synchronization control signal transmitter 322, and to synthesize the mixed signals with a signal of a predetermined carrier-wave band set to, for example, a milimeter-wave band. Also, the transmission signal converter 332 may include a filter Filter to filter signals output from the uplink service band frequency converter 312 with signals output from the synchronization control signal transmitter 322, and an amplifier AMP to appropriately amplify and output the output of the radio communication band upconverter Mix.

The configuration and operations of the mobile communication base station system including the donor unit and the remote unit according to an embodiment of the present disclosure have been described above. Meanwhile, the embodiments of the present disclosure as described above can be modified within the scope of the present disclosure.

Figure 5:
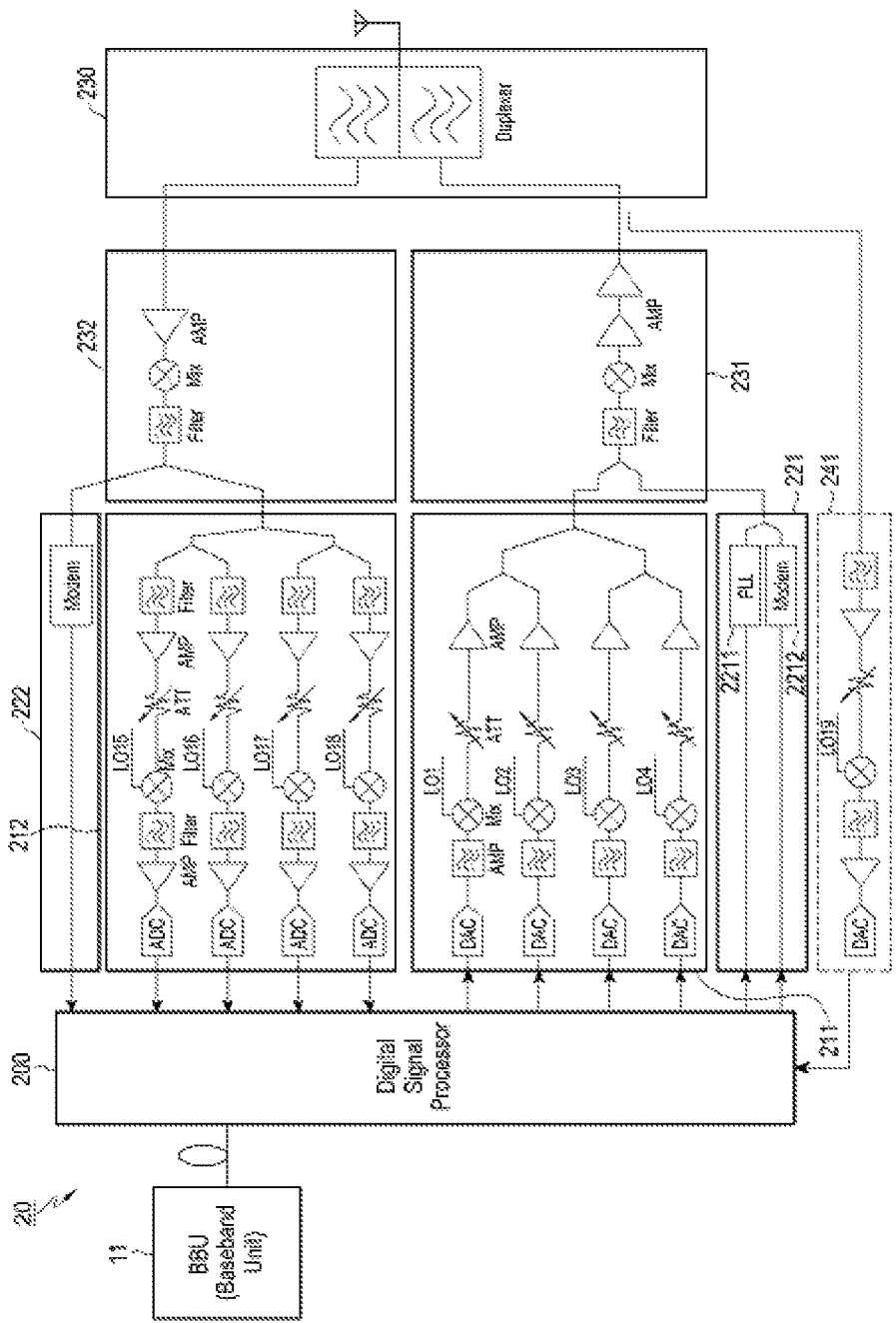
FIG. 5 is a block configuration diagram showing a modification example of the donor unit of FIG. 3.

For example, the donor unit shown in FIG. 3 may adopt Digital Pre-Distortion (DPD) technology that is applied in a general radio transmission signal processing technique. FIG. 5 shows an example of adopting the DPD technology. The donor unit shown in FIG. 5 includes a feedback circuit 241 to partially couple the output of a transmission signal in front of the antenna to generate a feedback signal for DPD, in order to compensate for linear characteristics of the power amplifier of the transmission signal converter 231 and the downlink service band frequency converter 211. The digital signal processor 200 may have a predistortion function of receiving the feedback signal for DPD and removing Inter-Modulation Distortion (IMD) generated in a power amplifier(s) at the rear end. The feedback circuit 241 may have a structure of a frequency downmixer to amplify or attenuate an input RF signal according to a predetermined control value and to perform frequency downconversion and digital conversion.

As such, the donor unit may include the feedback circuit 241 to enable the digital signal processor 200 to additionally perform the DPD function.

Also, according to another embodiment of the present disclosure, the remote unit shown in FIG. 4 may further include, likewise, an appropriate circuit configuration for receiving and appropriately adjusting the output of a power amplifier. For example, the remote unit may include, like the donor unit, a configuration for receiving a part of a signal output through the wireless communication unit and performing digital predistortion.

Also, an example in which a baseband unit is connected to a donor unit through an optical communication method has been described above, however, the baseband unit may be connected to the donor unit through an RF cable based on an Open Base Station Architecture Initiative (OBSAI) specification or an Open Radio Interface (ORI) specification or through a radio connection method.

Also, in the above description, the donor unit and the remote unit include a configuration for generating and receiving a synchronization signal. However, the donor unit and the remote unit may include no configuration for generating and receiving a synchronization signal.

As described above, the mobile communication base station system according to the present disclosure can be newly installed quickly and efficiently at low costs. Also, between the baseband unit and the donor unit/remote unit, Multiple Input Multiple Output (MIMO) expansion is allowed through, for example, a multichannel method to transfer data through a more efficient wireless communication method while satisfying massive data transfer requirements according to a MIMO method.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile communication base station system comprising:
   a donor unit connected to a baseband unit;
   a remote unit installed at a base station antenna side; and
   wherein the donor unit comprises a baseband signal processor including a digital signal processor to process an interface with the baseband unit, a wireless communication unit to process a wireless communication signal between the baseband signal processor and the remote unit, and a synchronization and communication controller configured to generate a communication control signal and a synchronization signal using a signal received from the baseband unit,
   wherein the remote unit comprises a service signal processor to process a Multiple Input Multiple Output (MIMO) interface with the base station antenna, a wireless communication unit to process a wireless communication signal between the service signal processor and the donor unit, and a synchronization and communication controller configured to receive a synchronization signal and a communication control signal received from the donor unit,
   wherein the baseband signal processor of the donor unit receives a downlink signal from the baseband unit, divides the downlink signal into a plurality of transmission channels, converts the plurality of transmission channels into a plurality of predetermined Radio Frequency (RF) bands, respectively, shifts frequencies of the predetermined RF bands by a predetermined amount, and then outputs the resultant RF bands, and
   the wireless communication unit of the donor unit synthesizes a signal output from the baseband signal processor to convert the signal into a predetermined frequency band, and transmits the predetermined frequency band in a wireless communication.

2. The mobile communication base station system of claim 1, wherein the synchronization and communication controller of the donor unit performs a function of generating a synchronization signal for synchronizing with an output frequency of a predetermined frequency band using a signal provided from the digital signal processor, and generating a control signal of a predetermined frequency band according to a control command related to communication control provided from the digital signal processor, and the wireless communication unit of the donor unit synthesizes the synchronization signal and the control signal output from the synchronization and communication controller with the signal output from the baseband signal processor, converts the synchronized signal into a signal of a predetermined frequency band, and then transmits the signal of the predetermined frequency band in a wireless communication.

3. The mobile communication base station system of claim 2, wherein the wireless communication unit of the donor unit receives a signal transmitted in a wireless communication from the remote unit, converts the signal into an RF band, and then outputs the RF band;

the baseband signal processor of the donor unit receives a signal output from the wireless communication unit, divides the signal into a plurality of reception channels, converts the plurality of reception channels into a plurality of predetermined Intermediate Frequency (IF) bands, respectively, and then provides the IF bands to the digital signal processor; and the synchronization and communication controller of the donor unit extracts a control response signal transmitted from the remote unit from the signal output from the wireless communication unit, and provides the control response signal to the digital signal processor.

4. The mobile communication base station system of claim 3, wherein the baseband signal processor of the donor unit comprises a downlink frequency converter, and the downlink frequency converter comprises:

a plurality of digital/analog converters configured to convert signals of the transmission channels into a plurality of analog signals of IF bands, respectively, and to output the plurality of analog signals;

a plurality of frequency upconverters configured to synthesize the signals output from the plurality of digital/analog converters with a plurality of predetermined local oscillation signals, respectively, to shift the synthesized signals by a predetermined amount to convert the signals into a plurality of predetermined RF bands, and to output the plurality of predetermined RF bands; and a plurality of transmission amplifiers configured to amplify signals output from the plurality of frequency upconverters to high power.

5. The mobile communication base station system of claim 3, wherein the baseband signal processor of the donor unit comprises a uplink frequency converter, and the uplink frequency converter comprises a plurality of frequency downconverters configured to mix signals of the reception channels with a plurality of predetermined local oscillation signals to convert the signals into the plurality of predetermined IF bands.

6. The mobile communication base station system of claim 1, wherein the remote unit comprises:

a wireless communication unit configured to receive the signal transmitted in the wireless communication from the wireless communication unit of the donor unit, to convert the signal into a signal of an Radio Frequency (RF) band which belongs to a frequency band for a predetermined wireless communication service, and then to output the signal of the RF band;

a service signal processor configured to receive the signal output from the wireless communication unit of the remote unit, to divide the signal into a plurality of transmission channels, to convert the plurality of transmission channels into a plurality of RF bands which belong to the frequency band for the predetermined mobile communication service, and to output the RF bands to the base station antenna; and a synchronization and communication controller configured to extract the synchronization signal from the signal output from the wireless communication unit of the remote unit, and to receive the communication control signal.

7. The mobile communication base station system of claim 6, wherein the service signal processor of the remote unit receives a reception signal from the base station antenna, divides the reception signal into a plurality of reception channels, converts the plurality of reception channels into a plurality of RF bands which belong to the frequency band for the predetermined mobile communication service, respectively, shifts frequencies of the RF bands by a predetermined amount, and outputs the resultant RF bands;

the synchronization and communication controller of the remote unit generates a control signal of a predetermined frequency band, and provides the control signal to the donor unit; and the wireless communication unit of the remote unit synchronizes the signals of the reception channels output from the service signal processor and the synchronization and communication controller with the communication control signal, and transmits the synchronized signal to the donor unit in a wireless communication.

8. The mobile communication base station system of claim 1, wherein the donor unit receives a signal fed back from among signals output through the wireless communication unit installed at the donor unit and performs digital predistortion on the received signal.

9. The mobile communication base station system of claim 1, wherein the remote unit receives a signal fed back from among signals output through the wireless communication unit installed at the remote unit, and performs digital predistortion on the received signal.

10. The mobile communication base station system of claim 1, wherein the service signal processor of the remote unit comprises a downlink service band frequency converter, and the downlink service band converter comprises a plurality of frequency converters configured to mix signals of the transmission channels with a plurality of predetermined local oscillation signals, respectively, to convert the signals into a plurality of RF signals of a corresponding transmission frequency band.

11. The mobile communication base station system of claim 1, wherein the service signal processor of the remote unit comprises a uplink service band frequency converter, and the uplink service band frequency converter comprises:

a plurality of frequency converters configured to mix signals of the reception channels with a plurality of predetermined local oscillation signals, respectively, to shift the mixed signals by a predetermined amount, and to output the resultant signals; and a plurality of reception amplifiers configured to low-noise amplify the signals received from the plurality of frequency converters.

12. The mobile communication base station system of claim 1, wherein the donor unit is connected to the remote unit according to at least one of a daisy-chain, a relay for multi-hop, and a point to multi-point wireless link.

13. A remote unit included in a mobile communication base station system, comprising:

a wireless communication unit configured to receive a signal transmitted in a wireless communication from a baseband unit, to convert the received signal in the wireless communication into a Radio Frequency (RF) band which belongs to a frequency band for a predetermined mobile communication service, and to output the RF band;

a service signal processor configured to receive a signal output from the wireless communication unit, to divide the signal into a plurality of transmission channels, to convert the plurality of transmission channels into a plurality of RF bands which belong to the frequency band for the predetermined mobile communication service, and to output the plurality of RF bands to a base station antenna; and a synchronization and communication controller configured to extract a synchronization signal from the signal output from the wireless communication unit, and to receive a control signal, wherein the service signal processor receives a reception signal from the base station antenna, divides the reception signal into a plurality of reception channels, converts the plurality of reception channels into a plurality of RF bands which belong to the frequency band for the predetermined mobile communication service, shifts frequencies of the RF bands by a predetermined amount, and outputs the resultant RF bands, the synchronization and communication controller generates a control signal of a predetermined frequency band, and provides the control signal to the donor unit, and the wireless communication unit synthesizes the signals of the reception channels output from the service signal processor and the synchronization and communication controller with a communication control signal, and transmits the synchronized signal to the donor unit.

14. The remote unit of claim 13, wherein the service signal processor comprises a downlink service band frequency converter, and the downlink service band converter comprises a plurality of frequency converters configured to mix the signals of the transmission channels with a plurality of predetermined local oscillation signals, respectively to convert the signals into a plurality of RF signals of a predetermined transmission frequency band, respectively.

15. The remote unit of claim 13, wherein the service signal processor comprises a uplink service band frequency converter, and the uplink service band frequency converter comprises:

a plurality of frequency converters configured to synthesize signals of the reception channels with a plurality of predetermined local oscillation signals to shift frequencies of the signals by a predetermined amount, and to output the resultant signals; and a plurality of reception amplifiers configured to low-noise amplify the signals received from the plurality of frequency converters.

\* \* \* \* \*